G. E. STEVENS.
CONTROLLING MECHANISM FOR AUTOMOBILES.
APPLICATION FILED DEC. 17, 1914.
1,191,625.  Patented July 18, 1916.
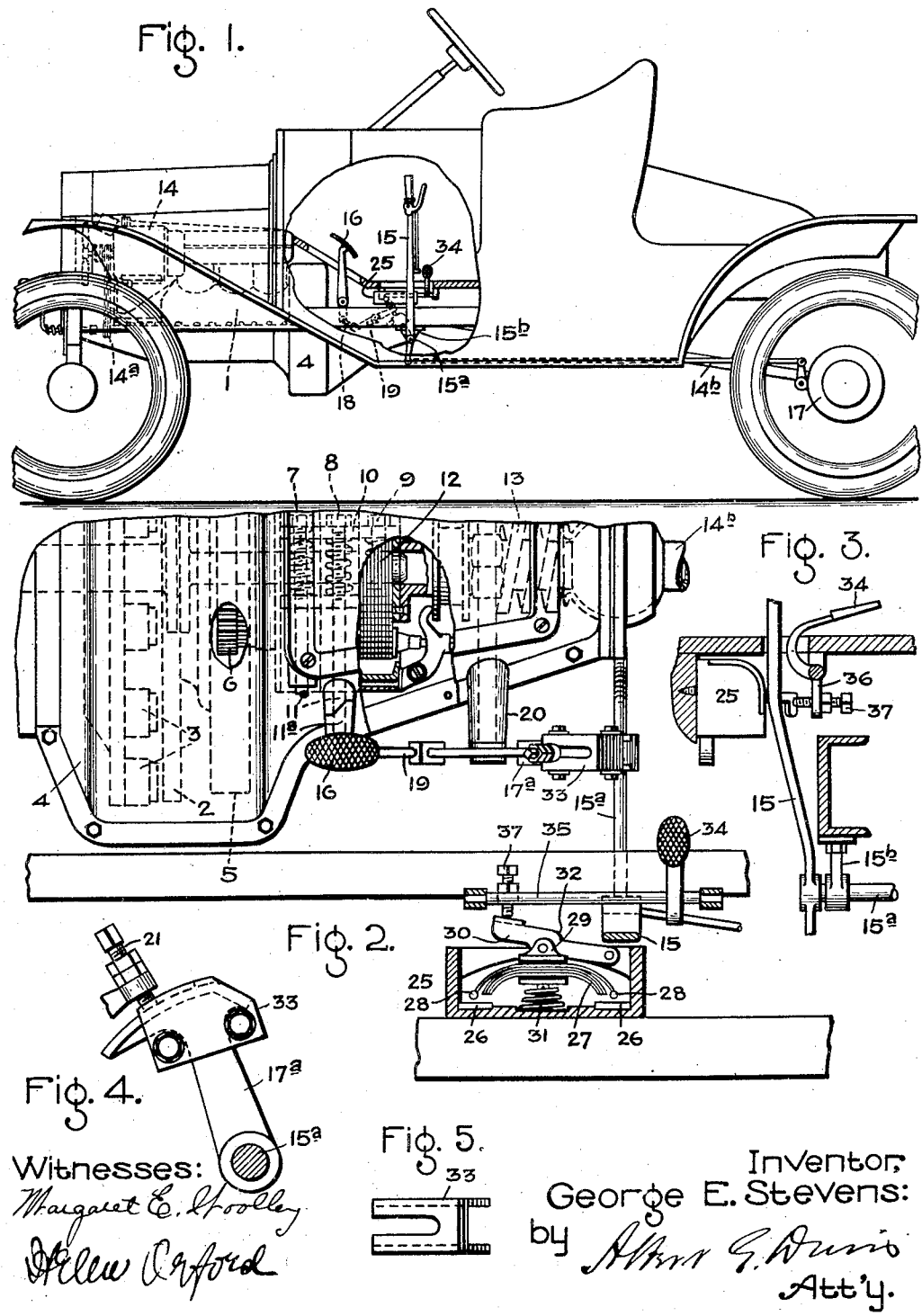
Witnesses:  
Margaret E. Hooley  
Helen Orford
Inventor,  
George E. Stevens:  
by Albert G. Davis  
Att'y.

UNITED STATES PATENT OFFICE.

GEORGE E. STEVENS, OF LYNN, MASSACHUSETTS, ASSIGNOR TO GENERAL ELECTRIC COMPANY, A CORPORATION OF NEW YORK.

CONTROLLING MECHANISM FOR AUTOMOBILES.

1,191,625.

Specification of Letters Patent.

Patented July 18, 1916.

Application filed December 17, 1914. Serial No. 877,696.

*To all whom it may concern:*

Be it known that I, GEORGE E. STEVENS, a citizen of the United States, residing at Lynn, county of Essex, State of Massachusetts, have invented certain new and useful Improvements in Controlling Mechanism for Automobiles, of which the following is a specification.

The present invention relates to controlling mechanism for automobiles which are provided with electric starting motors, or combined starting motors and electric generators, and has for its object to provide a simple and effective controlling mechanism for the motor and generator, and one which is so interconnected with the normal controlling mechanism of the vehicle as to prevent improper use thereof.

In particular I aim to provide an automobile with an electric starting, lighting and battery charging system, which system is so arranged that the ordinary operating means required in controlling the vehicle also controls the electrical apparatus thereby preventing the operator, as fully as possible, from doing the wrong thing or neglecting to do the proper thing.

For a consideration of what I believe to be novel and my invention, attention is directed to the accompanying description and claims appended thereto.

In the accompanying drawing which illustrates one of the embodiments of my invention, Figure 1 is a view in side elevation of an automobile; Fig. 2 is a partial plan view illustrating parts of the speed changing gearing and the motor switch and its actuating means; Fig. 3 is a cross-sectional view of the same; Fig. 4 is a detail view in elevation of an interlocking means, and Fig. 5 is a plan view thereof.

In describing my invention I shall do so in connection with the well known Ford automobile since it has great utility in connection therewith, but it is to be understood that the invention is not necessarily limited thereto.

In the drawing is shown an automobile which is provided with the usual internal combustion engine 1. This engine is controlled in the usual way by a throttle and a spark adjusting lever, not shown, and generally mounted on the steering column. On the shaft of the engine is the rotor 2 of a magneto for supplying current to the spark plugs. The stator having magnet coils 3 is mounted on the casing 4 that incloses the working parts. On the engine shaft, or on a continuation thereof, is also a fly wheel 5 which carries pinions 6 that mesh with gears carried by concentric sleeves surrounding said shaft. Surrounding the sleeves and connected thereto is a reversing drum 7, a low speed drum 8, and a service brake drum 9. Surrounding each drum is a brake band 10 whose up-turned ends are normally separated by a coiled compression spring. Passing through the ends of each band is a spindle 11 having a beveled face cam 11$^a$ fixed thereon that engages a corresponding fixed cam on the casing 4. The forward movement of the pedal connected to the spindle causes the cam to move the spindle longitudinally and move the band into contact with its drum. Each brake band has its own pedal, but for simplicity only one is shown.

12 indicates a multiple disk clutch that comes into service for high speed operating conditions, and 13 indicates a coiled compression spring for causing the clutch parts to engage when it is released.

Mounted on the side of the engine and shown in dotted lines, is a dynamo electric machine 14 which serves as a motor for starting the engine after the main or supply circuit is closed, and also as a generator to furnish current for charging the storage battery and for lighting after the engine is in operation. The rotor of the machine is connected to the engine shaft by a suitable driving connection, such as a chain or gearing 14$^a$. The details of construction of said machine are immaterial to the present invention. It is sufficient to say that after the engine is started and attains a predetermined speed the machine operates as a generator to furnish current.

As has been indicated above, the Ford automobile has a planetary system of gearing between the engine and the propeller shaft 14$^b$ leading to the differential in the rear axle. At a suitable point convenient to the driver is a hand actuated controlling lever 15 which has three principal positions. When moved to its rear position it first opens the clutch 12 through its action on the clutch pedal 16 and then applies the emergency brakes 17. When moved slightly forward of a vertical plane to its neutral position the brakes are released, and when moved to the extreme forward position it permits the clutch to close and the vehicle can be operated at its highest speed. The foot actuated clutch pedal 16 projects up through the floor of the vehicle and is supported by a horizontal spindle 11 that actuates the central brake band. It has three principal positions—forward to permit the proper engagement of the transmission parts to drive the vehicle forward at its lowest or starting speed; an intermediate or neutral position slightly in the rear of the first where the transmission parts are released and the engine is permitted to run free, and a rear position where the parts of the clutch 12 are in contact and the engine is driving direct. The hand controlling lever 15 is mounted on a cross shaft 15$^a$ supported in suitable bearings 15$^b$, of which one is shown carried by the frame of the chassis. On the cross shaft is a cam 17$^a$ that forms part of an interlock between the controlling lever 15 and the clutch pedal 16, so that the latter can only move into its high speed position after the hand lever has been moved to its forward position. This cam, acting through the pedal, causes the clutch 12 to be released when the hand lever is moved to its rear or braking position. The other parts of this interlock are arranged as follows: To the lower end of the clutch pedal is attached a link 18, the rear end of which is adjustably connected to a short lever 19 that is pivotally supported in a bracket 20 carried by the transmission casing 4. The rear end of the lever is provided with an adjustable screw 21, Fig. 4, whose lower end is engaged by the cam 17$^a$. When the parts are in the position shown in Fig. 4, the clutch pedal 16 is prevented from moving to its rear or high speed position. Just as soon, however, as the controlling lever 15 is moved by hand to its extreme forward position, the clutch pedal also being in a forward position, the cam 17$^a$ is moved out from under the screw 21 and the pedal 16 can then move to its rear or high speed position when permitted to do so by the operator removing pressure therefrom. The parts of the controlling mechanism thus far described are old and well known.

Referring now to the controlling means for the combined starting motor and electric generator, 25 indicates a switch that may conveniently be attached to one of the floor beams of the body and controls the circuit between the storage battery, not shown, and the dynamo electric machine. It comprises a pair of fixed contacts 26 and a flexible laminated bridging member 27 whose outer lamination is provided with slightly enlarged ends 28 that form arcing contacts and thus save the other laminations from injury. The bridging piece is mounted in a holder 29 from which it is suitably insulated. The holder is pivotally attached to a lever 30 and is normally pressed outwardly to open the circuit by a relatively stiff compression spring 31. The back of the lever is provided with an inclined or cam surface 32 with which the controlling lever 15 is adapted to engage as it is moved forward from its neutral position, said movement serving to close the circuit of the motor and battery through contacts 26 and bridging piece 27. The engine may be started by using the lever 15 to close the motor circuit, but I prefer to use the auxiliary pedal to be described later. If the engine is started with this lever the ignition circuit, either battery or magneto, is first closed and the clutch pedal 16 is then moved to and held at its neutral or intermediate position, thereby disconnecting the engine from the transmission gearing. After this is done the hand lever is moved to a forward position where it engages the inclined part 32 and closes the switch, thus starting the motor. After the engine begins to fire the clutch pedal is moved forward putting into action the low speed gearing. Subsequently the controlling lever is moved to its extreme forward position, which permits the clutch pedal to move to the high speed position when the engine is directly connected to the propeller shaft.

When the emergency brakes 17 are applied the controlling lever 15 is latched in its rear position, and this is the position it should occupy whenever the vehicle is standing still. To prevent any one who meddles with this lever from inadvertently starting the car by closing the circuit of the starting motor, I provide an interlock between it and the clutch pedal 16. To this end I mount a slotted plate 33 on the top of the cam 17$^a$ and locate the slot in the path of the screw 21 moved by the clutch pedal. The right hand end of the slot terminates at such a point that the screw will strike it and prevent the hand controlling lever 15 from being moved forward to such position that it will close the main switch 25. In this manner the electric motor is prevented from starting when the emergency brakes are released. In order to move the lever farther to the switch closing position it is necessary to apply such an amount of pressure to the foot pedal 16 as will raise the end of the screw 21 above the rear end wall of the slot. To state the matter in another way, two operations are required to start the engine by the electric motor when the lever 15 is used, both manual, one being under the control of the operator's hand, and the other his foot.

Another and valuable feature of my improved arrangement resides in the fact that whenever the controlling lever 15 is moved back to neutral or to emergency brake position, the circuit of the dynamo electric machine is automatically opened, and this whether it has been acting as a motor or as a generator. In all cases the clutch is opened before the brake can be applied. It should be borne in mind in this connection that whenever a Ford car is stopped the controlling lever 15 either has to be moved to neutral or to the emergency brake position; the latter being according to the best established practice. The importance of opening the motor circuit when the car is stopped can best be illustrated by considering what would take place if the circuit was not interrupted. Under these conditions the engine would generally be turned over slowly with a limited supply of fuel admitted thereto. This would mean a reduction in speed of the motor to a point where the counter-electromotive force developed by the armature would be insufficient to hold back the current supplied by the battery, and if this condition existed long enough it would burn out the motor and completely discharge the battery and possibly injure the same. In other words, with a very slowly turning engine there would be practically a short circuit through the motor. Further, if the circuit was not interrupted the motor might propel the vehicle forward for it is powerful enough for the purpose. This feature is of special importance if the car is stopped in front of a railroad track to permit a train to pass, in which case carelessness on the part of the operator might permit the electric motor to drive the car forward, even though the engine was not operating as such. As will appear, my aim is to reduce to a minimum all chance for the operator to do the wrong thing or to forget to do the proper thing. In so far as is possible, the operator should drive the car in the ordinary manner and the electrical apparatus will be fully taken care of.

In order to start the engine under normal conditions, I provide a foot pedal 34 that is mounted on a short fore and aft shaft 35 carried by the body or other convenient place alongside of the switch 25. On the lever is an arm 36 which carries an adjustable set screw 37, the latter being arranged to engage the switch lever 30 and close the circuit when the pedal is depressed. The spring 31 is powerful enough to open the circuit when pressure is removed from the pedal. After the engine is started by the electric motor, the ignition circuit having first been closed, the pedal 34 can be released and the vehicle started in motion in the ordinary manner by first releasing the emergency brakes and further manipulating the controlling lever 15 and the clutch pedal 16 to put the low speed gear into service and subsequently the high speed gear arrangement. One of the advantages of using the auxiliary pedal 34 in starting is that the emergency brakes may be left in applied position. This is particularly important where the vehicle has been left standing on an up-grade because the release of the emergency brake might permit the vehicle to run backward.

As described herein, the controlling lever 15 actuates the emergency brakes and also controls the action of the transmission gearing, but in certain aspects of my invention it is unnecessary that said lever shall actuate the brake.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A vehicle having an internal combustion engine for driving it, a means transmitting the power of the engine to the vehicle wheels, and a means controlling said transmitting means, in combination with a dynamo electric machine independent of the transmitting means whose rotor is connected to the engine shaft to drive it or be driven thereby, and a circuit controlling means for said machine which is responsive to movements of the power controlling means.

2. A vehicle having an internal combustion engine for driving it, speed changing gearing between the engine and vehicle wheels, and a means controlling the use of said gearing between the engine and vehicle wheels, in combination with a dynamo electric machine whose rotor is connected to the engine shaft, and a switch for said machine that is closed each time the controlling means is moved to one of its positions.

3. In combination, a vehicle having an internal combustion engine for driving it, a lever controlling the application of power of the engine to the vehicle wheels, a dynamo electric machine arranged to turn the engine shaft to start the engine and subsequently to be driven by it to supply current, and a switch in the circuit of the machine which is closed whenever the lever is in position to connect the engine to the vehicle wheels and is opened whenever the lever is moved to a position to disconnect the engine from said wheels.

4. In combination, a vehicle having an internal combustion engine, speed changing gearing for transmitting power from the engine to the vehicle wheels, a dynamo electric machine whose rotor is connected to the engine shaft for starting the engine, a switch in the machine circuit, means tending to open the switch, and a lever which has an oscillating movement and acts to control the gearing and closes the switch each time it is moved to a predetermined position.

5. In combination, a vehicle having an internal combustion engine, speed changing gearing between the engine and vehicle wheels, a dynamo electric machine whose rotor is connected to the engine for starting it, a switch in the machine circuit, a brake, and a lever which controls the gearing and also applies the brake, said lever holding the switch closed when in a forward position and permitting the switch to open before moving to a position to apply the brake.

6. In combination, a vehicle having an internal combustion engine for driving it, means transmitting power from the engine to the vehicle wheels, a pedal and a lever for jointly controlling the means, a dynamo electric machine whose rotor is connected to the engine shaft for driving it, and a controlling means for the circuit of the machine which is actuated by conjoint movements of the pedal and lever.

7. In combination, a vehicle having an internal combustion engine for driving it, speed changing gearing between the engine and vehicle wheels, a pedal and a lever for controlling the gearing, a dynamo electric machine whose rotor is connected to the engine shaft, a controlling switch therefor which is actuated by the lever, and an interlock for preventing the lever from closing the switch until the pedal has moved to a predetermined position.

8. A vehicle having an internal combustion engine for driving it, speed changing gearing means between the engine and vehicle wheels, a pedal and lever for controlling the gearing means, a means coöperating with the lever to insure a predetermined sequence of movements of the pedal, in combination with a dynamo electric machine whose rotor is connected to the engine shaft for starting the engine, a switch in the circuit of the machine which is actuated by the lever, and an interlock between the pedal and lever which prevents the latter from actuating the switch until the pedal has been moved from its position of rest.

9. In combination, a vehicle having an internal combustion engine for driving it, a dynamo electric machine whose rotor is connected to the engine shaft to drive it or be driven thereby, a switch in the circuit of the machine, a manually actuated device for closing the switch to start the machine as a motor, and a means controlling the transmission of power of the engine to the vehicle wheels which also holds said switch closed during the running of the vehicle.

10. In combination, a vehicle having an internal combustion engine for driving it, a dynamo electric machine whose rotor is connected to the engine shaft to drive it or be driven thereby, a self opening switch through which current passes from a source to drive the machine as a motor and also to the source when the machine acts as a generator, a foot actuated device for closing the switch, and a hand lever which controls the application of power of the engine to the vehicle wheels and when in active position holds the switch in closed position.

11. In combination, a vehicle having an internal combustion engine for driving it, a dynamo electric machine whose rotor is connected to the engine shaft for starting the engine, a switch in the circuit of the machine, a means for actuating the switch, and a second means that prevents the first from actuating the switch until said second means has been moved to a predetermined position.

12. A vehicle having an internal combustion engine for driving it, a lever and a foot pedal for controlling the application of power of the engine to the vehicle wheels, and a cam which prevents certain movements of the pedal until the lever has been moved to a predetermined position, in combination with a dynamo electric machine whose rotor is connected to the engine shaft, a controlling switch for the machine which is actuated by the lever, and an interlocking device moving with the cam which prevents the lever from actuating the switch until the pedal is moved to a predetermined position.

13. A vehicle having an internal combustion engine for driving it, a lever and a foot pedal for controlling the application of power of the engine to the vehicle wheels, and a cam which prevents certain movements of the pedal until the lever has been moved to a predetermined position, in combination with a dynamo electric machine whose rotor is connected to the engine shaft, a controlling switch for the machine which is actuated by the lever, and a slotted member carried by the cam which prevents the lever from closing the switch until the pedal is moved to a predetermined position.

14. A vehicle having an internal combustion engine for driving it, a pedal and lever for controlling the application of power of the engine to the vehicle wheels, said lever also controlling the application of emergency brakes, in combination with a dynamo electric machine whose rotor is connected to the engine shaft, a controlling switch therefor which is actuated by the lever as it is moved from its brake applying position, and an auxiliary means for closing the switch when the lever is adjusted to its braking position.

15. A vehicle having an internal combustion engine for driving it, a shaft and gearing for transmitting power from the engine to the vehicle wheels, and means controlling the use of said shaft and gearing, in combination with a dynamo electric machine whose rotor is connected to the engine shaft for imparting motion thereto or receiving it therefrom, a circuit controller for said machine which is actuated by said means in moving from one of its positions to another, and a second means actuating the circuit controller when the first means has been moved to one of its said positions.

16. A vehicle having an internal combustion engine for driving it, a pedal and lever which jointly control the application of power of the engine to the vehicle wheels, said pedal and lever having oscillating movements, a dynamo electric machine whose rotor is connected to the engine shaft, and a switch for the machine that is closed by a predetermined movement of the lever after the pedal has been moved a limited amount and is released and permitted to open each time the lever is returned to one of its positions.

17. A vehicle having an internal combustion engine for driving it, a pedal and lever which jointly control the application of power of the engine to the vehicle wheels, said pedal and lever having oscillating movements, a dynamo electric machine connected to the engine shaft, a switch for the machine that is closed by a forward movement of the lever subject to the control of a forward movement of the pedal, and is released and permitted to open each time the lever is returned to its initial position.

18. A vehicle having an internal combustion engine for driving it, means for controlling the application of power of the engine to the vehicle wheels, in combination with a dynamo electric machine whose rotor is connected to the engine shaft, a controlling switch in the circuit of the machine which is normally actuated by said means, and an auxiliary device for closing said switch independently of said means.

19. A vehicle having an internal combustion engine for driving it, a shaft and gearing for transmitting power from the engine to the vehicle wheels, and a lever for controlling the use of said shaft and gearing which has forward and backward positions, in combination with a dynamo electric machine whose rotor is connected to the engine shaft to transn.. or receive motion therefrom, and a circuit controller for the machine which is moved to its closed position and held there by said lever so long as it occupies one of said positions.

In witness whereof, I have hereunto set my hand this 14th day of December, 1914.

GEORGE E. STEVENS.

Witnesses:
John A. McManus, Jr.,
John F. Beechlyn.

Copies of this patent may be obtained for five cents each, by addressing the "Commissioner of Patents, Washington, D. C."